(12) United States Patent
Ali et al.

(10) Patent No.: US 7,893,010 B2
(45) Date of Patent: Feb. 22, 2011

(54) COMPOSITION AND METHOD FOR FLUID RECOVERY FROM WELL

(75) Inventors: Syed Ali, Sugar Land, TX (US); Leiming Li, Sugar Land, TX (US); Paul R. Howard, Sugar Land, TX (US); Sumitra Mukhopadhyay, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 58 days.

(21) Appl. No.: 12/433,420

(22) Filed: Apr. 30, 2009

(65) Prior Publication Data

US 2009/0281004 A1 Nov. 12, 2009

Related U.S. Application Data

(60) Provisional application No. 61/051,573, filed on May 8, 2008.

(51) Int. Cl.
| | |
|---|---|
| *C09K 8/60* | (2006.01) |
| *C09K 8/62* | (2006.01) |
| *C09K 8/584* | (2006.01) |
| *C09K 8/588* | (2006.01) |
| *E21B 43/26* | (2006.01) |

(52) U.S. Cl. ............ 507/219; 166/305.1; 166/308.1; 507/244; 507/248; 507/250; 507/252; 507/259; 507/261; 507/263; 507/266; 507/904; 507/922; 507/924; 516/53; 516/67; 516/72; 516/922

(58) Field of Classification Search ............ 507/219, 507/244, 248, 250, 252, 259, 261, 263, 266, 507/904, 922, 924; 166/305.1, 308.1; 516/53, 516/67, 72, 922
See application file for complete search history.

(56) References Cited

U.S. PATENT DOCUMENTS

| | | | | |
|---|---|---|---|---|
| 4,548,721 A | * | 10/1985 | DeBons et al. | 507/259 |
| 5,310,002 A | | 5/1994 | Blauch et al. | |
| 2002/0132740 A1 | * | 9/2002 | Von Krosigk et al. | 507/200 |
| 2003/0166472 A1 | | 9/2003 | Pursley et al. | |
| 2006/0096757 A1 | | 5/2006 | Berry et al. | |
| 2006/0258541 A1 | * | 11/2006 | Crews | 507/203 |

FOREIGN PATENT DOCUMENTS

WO 0142387 6/2001

OTHER PUBLICATIONS

SPE86556—John T. Pursley; Glenn Penny; David Holcomb; Microemulsion Additives Enable Optimized Formation Damage Repair and Prevention; Society of Petroleum Engineers; 2004; pp. 18-20; Presented at SPE International Symposium and Exhibition on Formation Damage Control: Lafayette, Louisiana, U.S.A.; Feb. 2004.
SPE94274—G. Penny, J.T. Pursley; D. Holcomb; The Application of Microemulsion Additives in Drilling and Stimulation Results in Enhanced Gas Production; Society of Petroleum Engineers; 2005; pp. 17-19; Presented at SPE Production and Operations Symposium; Oklahoma City, Oklahoma, U.S.A; Apr. 2005.
SPE100434—G.S. Penny, J.T. Pursley, T.D. Clawson; Field Study of Completion Fluids to Enhance Gas Production in the Barnett Shale; Society of Petroleum Engineers; 2006; pp. 15-17; Presented at SPE Gas Technology Symposium; Calgary, Alberta, Canada; May 2006.
SPE107844—Glenn Penny, John T. Pursley; Field Studies of Drilling and Completion Fluids to Minimize Damage and Enhance Gas Production in Unconventional Reservoirs; Society of Petroleum Engineers; 2007; pp. 30; Presented at European Formation Damage Conference; Scheveningen, The Netherlands; Jun. 2007.
SPE107982—John T. Pursley, Glenn Penny, John Benton, Gary Nordlander, Mike McDougall, Davide Greene, Jame W. Crafton; Field Case Studies of Completion Fluids to Enhance Oil and Gas Production in Depleted Unconventional Reservoir; Society of Petroleum Engineers; 2007; pp. 16-18; Presented at SPE Rocky Mountain Oil and Gas Technology Symposium; Denver, Colorado, U.S.A.; Apr. 2007.

* cited by examiner

*Primary Examiner*—Timothy J. Kugel
(74) *Attorney, Agent, or Firm*—Martin Rzaniak; David Cate; Robin Nava

(57) ABSTRACT

A well treatment microemulsion for use in a subterranean formation is disclosed, the microemulsion comprises a solvent blend comprising a solvent and a co-solvent; a surfactant blend comprising a surfactant, wherein the surfactant blend is able to give formation intermediate wettability properties; an alcohol; and a carrier fluid; wherein the alcohol, the solvent and surfactant blends are combined with the carrier fluid to produce the well treatment microemulsion. By intermediate wettability it is meant that the water has an advancing contact angle on the surface between 62 and 133 degrees. The associate method of treating a subterranean formation of a well with the microemulsion and the associate method of modifying the wettability of the formation with the microemulsion are also disclosed.

13 Claims, 2 Drawing Sheets

COMPOSITION AND METHOD FOR FLUID RECOVERY FROM WELL

RELATED APPLICATIONS

The present application claims the benefit of U.S. Provisional Patent Application No. 61/051,573 filed May 8, 2008, now expired, entitled Composition and Process for Fluid Recovery from Gas Wells, which is hereby incorporated by reference.

FIELD OF THE INVENTION

This invention relates to compositions and methods for treating subterranean formations penetrated by well bores to stimulate the production of gas therefrom. More particularly, the invention relates to compositions and methods for improving the recovery of petroleum products from subterranean formations. Most particularly, the invention relates to use of a microemulsion.

BACKGROUND

Hydraulic fracturing is commonly used in stimulation of tight gas reservoirs. In mid nineties, most of the tight gas reservoirs were fractured utilizing the crosslinked gelled fluids. In an effort to reduce treatment costs, slick water fracturing has emerged as the method of choice. The success of slick water fracturing has been attributed to its ability to contact a larger surface area of the reservoir with minimum fluid-induced damage to the fracture face and within the proppant pack. In a typical treatment, several million gallons of water is pumped at an average rate of 65 bpm with sand ranging in concentration from 0.25 to 1.0 ppg. Several chemicals are added on the fly during the treatment. The common additives include scale inhibitor, friction reducers, biocides, clay swelling inhibitors, oxygen scavengers and surfactants.

One of the continuing challenges in slick water fracturing of tight gas reservoirs is the post treatment fluid recovery. About 60 to 90% of the injected fluids stay in the reservoirs. It is likely that large quantities of water are trapped in the area surrounding the fracture and within the fracture itself. This could be due to interfacial tension between water and reservoir rock or capillary end effect in and around the vicinity of the face of the fractured rock. The trapped fluid has detrimental effect on well productivity. Several approaches have been used to overcome this problem. Low vapor pressure co-solvents can be added to the fluid or as a post fluid to increase the evaporation of the water in the dry gas. Surfactants are also incorporated in the fracturing fluid to reduce the capillary pressure between the fluid and the gas.

Surfactants work by lowering the surface tension of the gas-liquid or liquid-solid interface. A few surfactants, such as a 8:1 weight ratio solution of water:decyl-dimethyl amine oxide change the wettability of the rock from water wet to mixed wettability; which further lowers capillary pressure. However, surfactants alone do not provide adequate water recovery.

In parallel, microemulsions may be used to aid the flowback of fracturing fluid from wells. The concept is to add a water-wetting conventional surfactant to an emulsion containing a solvent; thereby to get the advantages of both in terms of helping reduce capillary pressure. Prior art solution in U.S. Pat. No. 5,310,002 discloses such attempt with an additive for addition to conventional well treatment fluids to enhance the ability of the fluids to be recovered from subterranean formations, to generate a foam in association with the fluids and/or to enhance the ability of the fluids to remove water and other connate fluids interlocked with gas in the formations. The additive includes about 25% to about 50% by volume of a microemulsion generating component which forms an acid and/or water external microemulsion when added to the treatment fluid, and about 50% to about 75% by volume of a foaming agent component. The foaming agent component includes at least one nonionic surface active agent having an HLB of from 12 to 22. The additive is particularly suitable for addition to foam fracturing fluids useful for stimulating tight or otherwise unconventional gas formations.

SUMMARY OF THE INVENTION

A micro emulsion with an intermediate wetting surfactant, and solvent further improve the properties. Thus microemulsion additives are disclosed which are highly effective in fluid recovery and relative permeability enhancement when applied in slick water fracturing at low concentrations.

A well treatment microemulsion for use in a subterranean formation is disclosed. The microemulsion comprises a solvent blend comprising a solvent and a co-solvent; a surfactant blend comprising a surfactant, wherein the surfactant blend is able to give formation intermediate wettability properties; an alcohol; and a carrier fluid; wherein the alcohol, the solvent and surfactant blends are combined with the carrier fluid to produce the well treatment microemulsion.

In an embodiment, the solvent is selected from the group consisting of: n-butyl acetate, ethyl lactate, methyl soyate, d-limonene and combinations thereof, and the co-solvent is ethylene glycol monobutyl ether.

In an embodiment, the alcohol is an alkyl alcohol, for example, the alcohol is isopropanol.

Still in another embodiment, the surfactant is selected from the group consisting of: alkyl sulfates, sulfonates, carboxylates, ethylene oxide-propylene oxide copolymers, polyoxyethylene alkyl ethers, primary alkylamines, dialkyl secondary amines, ethoxylated fatty amines, amine oxides, and combinations thereof. For example, the surfactant is decyl-dimethyl amine oxide.

In an alternative embodiment, the surfactant blend further comprises a co-surfactant. And optionally, the co-surfactant is oxyalkylated alcohols, e.g. butoxylated-ethoxylated C11-14-isoalkyl alcohols. The carrier fluid may be water based.

In another aspect, a method of treating a subterranean formation in a well is disclosed. The method comprises providing a solvent blend comprising a solvent and a co-solvent, a surfactant blend, an alcohol, and a carrier fluid; combining the alcohol, the solvent and surfactant blends with the carrier fluid to produce a well treatment microemulsion; introducing the microemulsion in to the well; and allowing the microemulsion to contact the formation to give intermediate wettability properties. After contact with the microemulsion, the water advancing contact angle on the formation is between 62 and 133 degrees.

Advantageously, the microemulsion is pumped into the well for fracturing operation. The method can further comprise introducing proppant in to the well. The carrier fluid may be water based.

In an embodiment, the solvent is selected from the group consisting of: n-butyl acetate, ethyl lactate, methyl soyate, d-limonene and combinations thereof, and the co-solvent is ethylene glycol monobutyl ether.

In an embodiment, the alcohol is an alkyl alcohol, for example the alcohol is isopropanol.

Still in an embodiment, the surfactant is selected from the group consisting of: alkyl sulfates, sulfonates, carboxylates, ethylene oxide-propylene oxide copolymers, polyoxyethylene alkyl ethers, primary alkylamines, dialkyl secondary amines, ethoxylated fatty amines, amine oxides, and combinations thereof. For example, the surfactant is decyl-dimethyl amine oxide.

In an alternative embodiment, the surfactant blend further comprises a co-surfactant. And optionally, the co-surfactant is oxyalkylated alcohols, e.g. butoxylated-ethoxylated C11-14-isoalkyl alcohols.

In an embodiment, the microemulsion has a concentration from 0.01 to 1% by weight. In another embodiment, the microemulsion has a concentration from 0.05 to 0.2% by weight.

Still in another aspect, a method of modifying the wettability property of a subterranean formation in a well is disclosed. The method comprises providing a solvent blend comprising a solvent and a co-solvent, a surfactant blend, an alcohol, and a carrier fluid; combining the alcohol, the solvent and surfactant blends with the carrier fluid to produce a well treatment microemulsion; introducing the microemulsion into the well; allowing the microemulsion to contact the formation; and leaving the formation with intermediate wettability properties. After contact with the microemulsion, the water advancing contact angle on the formation is between 62 and 133 degrees.

The carrier fluid may be water based. In an embodiment, the solvent is selected from the group consisting of: n-butyl acetate, ethyl lactate, methyl soyate, d-limonene and combinations thereof, and the co-solvent is ethylene glycol monobutyl ether.

In an embodiment, the alcohol is an alkyl alcohol, for example the alcohol is isopropanol.

Still in another embodiment, the surfactant is selected from the group consisting of: alkyl sulfates, sulfonates, carboxylates, ethylene oxide-propylene oxide copolymers, polyoxyethylene alkyl ethers, primary alkylamines, dialkyl secondary amines, ethoxylated fatty amines, amine oxides, and combinations thereof. The surfactant may be decyl-dimethyl amine oxide.

In an alternative embodiment, the surfactant blend further comprises a co-surfactant. And optionally, the co-surfactant is oxyalkylated alcohols, e.g. butoxylated-ethoxylated C11-14-isoalkyl alcohols.

In an embodiment, the microemulsion has a concentration from 0.01 to 1% by weight. In another embodiment, the microemulsion has a concentration from 0.05 to 0.2% by weight.

DETAILED DESCRIPTION

Figure 1:
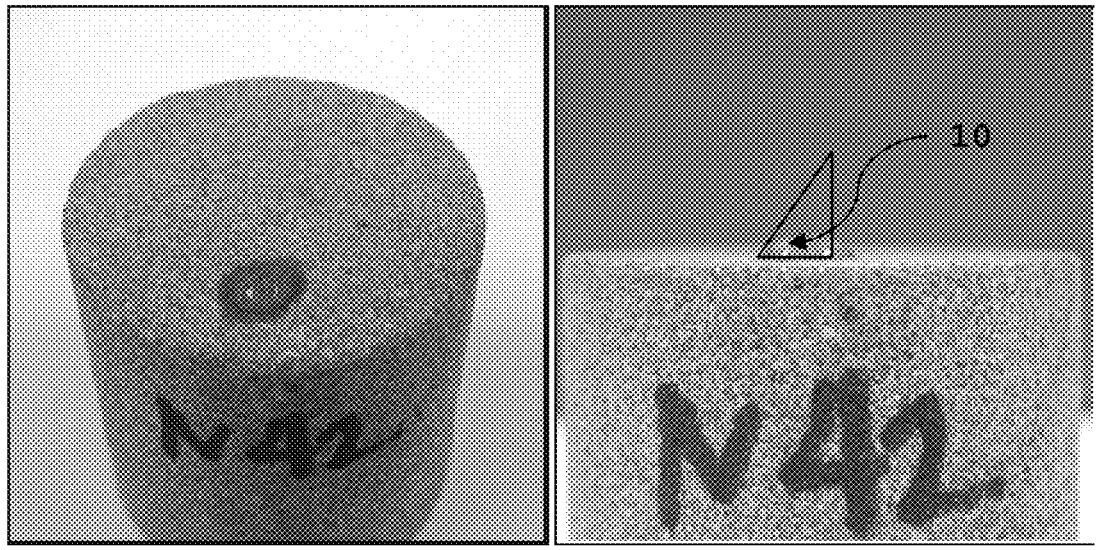
FIG. 1 shows a nugget core treated with a microemulsion according to one embodiment.

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The present invention relates to the preparation and use of a well treatment microemulsion for recovery during the production of hydrocarbons from subterranean reservoirs. The well treatment microemulsions of the present invention are stablilized microemulsions that are formed by the combination of a solvent-surfactant blend with an appropriate oil-based or water-based carrier fluid. The microemulsion forms upon simple mixing of the components without the need for high shearing generally required in the formation of ordinary macroemulsions. The microemulsion is thermodynamically stable system, and the droplets remain extremely finely dispersed over time. The droplet size ranges from about 10 nm to about 300 nm.

The solvent-surfactant blend generally includes a solvent blend, a surfactant blend and a coupling agent, generally made of an alcohol. The solvent blend is made from a solvent and a co-solvent. The surfactant blend is made of a surfactant and optionally of a co-surfactant.

In an embodiment, the solvent is selected from the group of unsaturated aliphatic cyclic hydrocarbons known as terpenes, including monoterpenes and diterpenes. In a particular embodiment, the solvent is the monoterpene d-limonene ($C_{10}H_{16}$). Terpenes, such as d-limonene, are preferred for their solvent qualities and biodegradability. In an alternate embodiment, the terpene-based solvent is replaced with alkyl, cyclic or aryl acid esters of short chain alcohols, such as ethyl lactate and hexyl ester. Ethyl lactate is a low cost, environmentally safe solvent that can be manufactured from carbohydrates, such as cornstarch. The solvent can also be a n-butyl acetate or a methyl soyate. It will also be understood that combinations of different solvents, such as d-limonene and ethyl lactate, are also encompassed within the scope of the present invention.

The selection of the surfactant blend for the solvent-surfactant blend is determined by its property to give intermediate wettability to subterranean formation and is determined by the type of carrier fluid selected. Water-based carrier fluids, such as fresh water and brine, are typically more environmentally friendly and cost effective. Oil-based carrier fluids, such as diesel, kerosene and jet fuel may provide enhanced performance but are generally more expensive and environmentally restricted.

Wettability is a key parameter for oil recovery. The term wettability generally defines the relative tendency of aqueous and oil phases to coat the solid or to fill the pore space of the rock under capillarity forces. Various methods of wettabilty determination are known in the art (Anderson, 1986 and Cuiec, 1986). The wettability of subterranean formation varies from strongly water-wet to the other extreme of strongly oil-wet. On many highly hydrophilic surfaces, water droplets will exhibit contact angles of 0° to 30°. When the formation has no affinity either with oil or either with water, the wettabilty is intermediate. Authors define differently intermediate wettability: for Treiber (1972) the water advancing contact angle on said formation is between 75 and 105 degrees; for Morrow (1976, in Capillary-pressure correlations for uniformly wetted porous-media. J. Can. Pet. Technol. 15 (4), 49-69) the water advancing contact angle on said formation is between 62 and 133 degrees. In the following application, by intermediate wettability it is meant that the water advancing contact angle on said formation is between 62 and 133 degrees. According to the invention, the surfactant blend is chosen so the subterranean formation has an intermediate wettability.

For a water-based carrier fluid, the surfactant of the surfactant blend should be capable of creating an oil-in-water microemulsion upon combination with an appropriate quantity of water. The surfactant may be selected from water soluble surfactants such as alkyl sulfates, sulfonates, carboxylates, etc., or nonionic surfactants such as ethylene oxide-propylene oxide copolymers, polyoxyethylene alkyl ethers, etc., or cationic surfactants such as primary alkylamines, dialkyl secondary amines, ethoxylated fatty amines, etc. Presently preferred oil-in-water surfactants include one or more of the following: amine oxides, preferentially amine oxides containing one long alkyl chain and two short (usually methyl) alkyls such as decyl-dimethyl amine oxide. A preferred oil-in-water surfactant mixture includes 8:1 weight ratio solution of water:decyl-dimethyl amine oxide.

In an embodiment, as explained above, the carrier fluid is a water-based carrier fluid; in this way the microemulsion can capture the oil trapped in the formation more efficiently. In another possible embodiment, but not preferred for oil recovery, an oil-based carrier fluid is chosen; in this way the microemulsion can capture the water trapped in the formation more efficiently. If an oil-based carrier fluid is chosen, the surfactant of the solvent-surfactant blend should be capable of creating a water-in-oil microemulsion upon combination with oil.

In an alternative embodiment, a co-surfactant is used. For a water-based carrier fluid, the surfactant and co-surfactant of the surfactant blend should be capable of creating an oil-in-water microemulsion upon combination with an appropriate quantity of water. The co-surfactant used in the microemulsions can be aliphatic alcohols, but may also be any of the surfactants mentioned above. Presently preferred co-surfactant includes one or more of the following: oxyalkylated alcohols such as butoxylated-ethoxylated C11-14-isoalkyl alcohols. A preferred oil-in-water surfactant/co-surfactant mixture includes decyl-dimethyl amine oxide and butoxylated-ethoxylated C11-14-isoalkyl alcohol.

The alcohol component of the solvent-surfactant blend serves as a coupling agent between the solvent blend and the surfactant blend, thereby stabilizing the microemulsion. The alcohol also lowers the freezing point of the well treatment microemulsion. Although isopropanol is presently preferred, alternative suitable alcohols include midrange primary, secondary and tertiary alcohols with between 1 and 20 carbon atoms, such as t-butanol, n-butanol, n-pentanol, n-hexanol and 2-ethyl-hexanol. Other freeze prevention additives can additionally or alternatively be added, such as detergent range alcohols ethoxylate, ethylene glycols (EG), polyethylene glycols (PEG), propylene glycols (PG) and triethylene glycols (TEG), with triethylene glycol being presently preferred.

The solvent-surfactant blend optionally includes a salt. The addition of a salt to the solvent-surfactant blend reduces the amount of water needed as a carrier fluid and also lowers the freezing point of the well treatment microemulsion. Among the salts that may be added for stability and co-solvent substitution, NaCl, KCl, $CaCl_2$, and $MgCl2$ are presently preferred. Others suitable salts can be formed from K, Na, Ca, Mg, Ba, Zn, Cs and Li families.

After blending the solvents, surfactants and alcohols, it may be desirable to form a diluted solvent-surfactant blend by adding a diluent before addition to the carrier fluid. It will be understood that upon addition of the diluent, the solvent surfactant blend may partially or completely emulsify.

For water-in-oil well treatment microemulsions, the solvent-surfactant blend preferably includes about 50%-95% by volume of the preferred water-in-oil surfactant mixture, about 4%-30% by volume of solvent blend and about 1%-20% isopropanol by volume. In a particular embodiment, the water-in-oil solvent-surfactant blend includes about 68% by volume of the preferred water-in-oil surfactant mixture, about 23% by volume of n-butyl acetate-ethylene glycol monobutyl ether mixture, and about 9% by volume of isopropanol.

In accordance with the method of the invention, the well treatment composition is introduced into the formation by way of the well bore. The microemulsion generating component can be admixed with the aqueous treatment fluid and other components employed at the well site in a suitable blender, batch mixer or the like. The well treatment microemulsion is in an embodiment used in stimulation operations. For example, if the composition is a fracturing fluid, the base fracturing fluid and other components employed can be admixed together in a blender at the well site. The microemulsion can be added to the fluid on the discharge side of the blender. In fracturing operations, proppant material can be added to the microemulsion before injection downhole. Any conventional proppant can be used. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, preferably pre-cured resin coated, provided that the resin and any other chemicals that might be released from the coating or come in contact with the other chemicals of the Invention are compatible with them.

In a particular embodiment, the microemulsion is used in combination with a slickwater job or post-treatment after a slickwater job. Microemulsion is used to aid the flowback of fracturing fluid from wells. By adding a microemulsion made of an intermediate wetting surfactant further improves to reduce capillary pressure. Thus, the microemulsion according to the invention is highly effective in fluid recovery and relative permeability enhancement when applied in slick water fracturing at low concentrations. Thanks to the microemulsion composition, the nanometer sized structures are modeled after Voronoi structures which when dispersed in slick water permit a greater ease penetration into the reservoir rock along the fractured face. The microemulsion is used to achieve the maximum post treatment recovery of fluids from the fractured wells.

The present method of the invention is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

The well treatment microemulsions can also be used to deliver acids during acidizing operations. Acids commonly used include hydrochloric, acetic, formic, and hydrochloric-hydroflouric acids. In an embodiment, the selected solvent-surfactant blend (dilute or concentrate) is combined with an acidified carrier fluid to prepare a microemulsion suitable for acidizing operations. Preferably, the microemulsion includes about 0.2%-5% by volume of the solvent-surfactant blend and about 3%-28% by volume of acid. In a particularly preferred embodiment, the microemulsion includes about 0.2%-5% of the solvent-surfactant blend and about 15% by volume of hydrochloric acid. The concentration of the well treatment microemulsion in gelled fluids lowers the friction created by contact with conduits, thereby facilitating the injection and withdrawal of the well treatment microemulsion.

Any additives normally used in well treatment fluids can be included, again provided that they are compatible with the other components and the desired results of the treatment. Such additives can include, but are not limited to breakers, anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

EXAMPLES

A series of experiments were conducted to compare effectiveness of the microemulsions.

To illustrate some embodiments according to the invention, analysis was conducted on microemulsion made with surfactant of decyl-dimethyl amine oxide and/or FreeFLO S (available from Champion Technologies; hereinafter referred to as Surfactant S) to test the surface tension lowering properties compared to surfactant alone.

In a first example, microemulsion is made up of 200 mL deionized water, 1 mL ethylene glycol monobutyl ether, 1 mL isopropyl alcohol, 5 mL Surfactant S, and 15 mL of a 8:1 weight ratio solution of water:decyl-dimethyl amine oxide. Since the surfactant concentrations are higher, microemulsion appears bluish clear. After drying in the oven at over 82° C. for over one day, the cooled core samples were soaked in microemulsion (solutions) for at least half day at room temperature, and then placed in the oven at about 65° C. for at least one day. Water droplets were applied to the surface of the treated core samples, and contact angles were recorded. Core samples used include Nugget core (2-6 mD, color reddish), Kentucky core (about 0.1 mD, color grey), and Barnett shale (tight gas, color black). Without treatment, water droplets spread out quickly on the surface of all these core samples, with a contact angle close to 0°. FIG. 1 shows a Nugget core treated with the microemulsion. Water beads up on the treated surface, with a contact angle 10 of 65±5°. This example shows that a microemulsion made with an intermediate wettability surfactant has the ability to lower capillary pressure to a greater extent.

Figure 2:
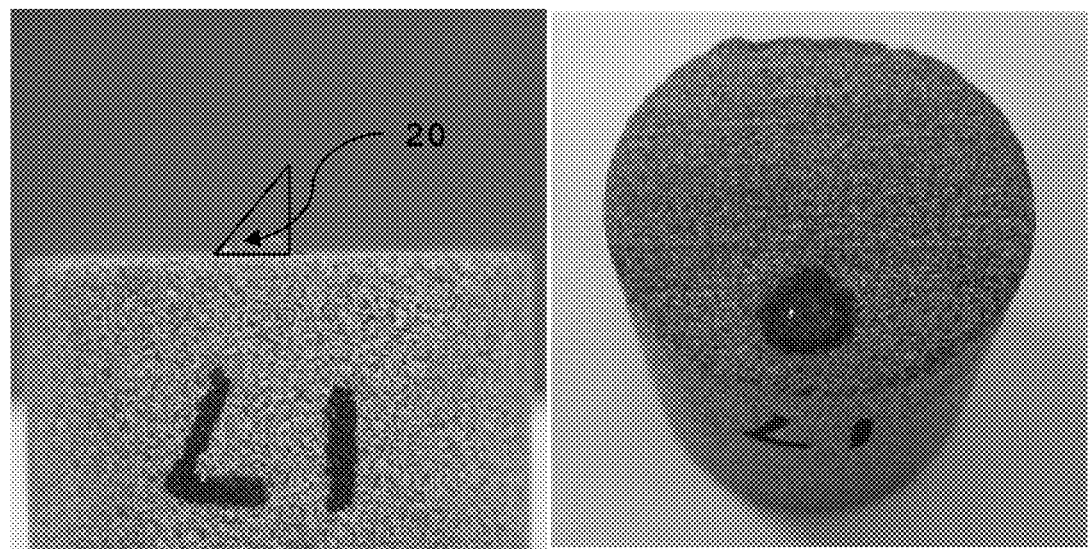
FIG. 2 shows a nugget core treated with a microemulsion according to another embodiment.

In a second example, microemulsion was made up of 200 mL deionized water, 2 mL ethylene glycol monobutyl ether, 2 mL isopropyl alcohol, 3 mL n-butyl acetate, and 15 mL of a 8:1 weight ratio solution of water:decyl-dimethyl amine oxide. The 2 mL ethylene glycol monobutyl ether, 2 mL isopropyl alcohol, and 3 mL n-butyl acetate were added to the water first, and surfactant was added drop by drop while blending. When the volume of surfactant reached 15 mL, the mixture turned from murky to clear, suggesting a transition from emulsion to microemulsion. FIG. 2 shows a Nugget core treated with the microemulsion. Water beads up on the treated surface, with a contact angle 20 of 64±5°.

Figure 3:
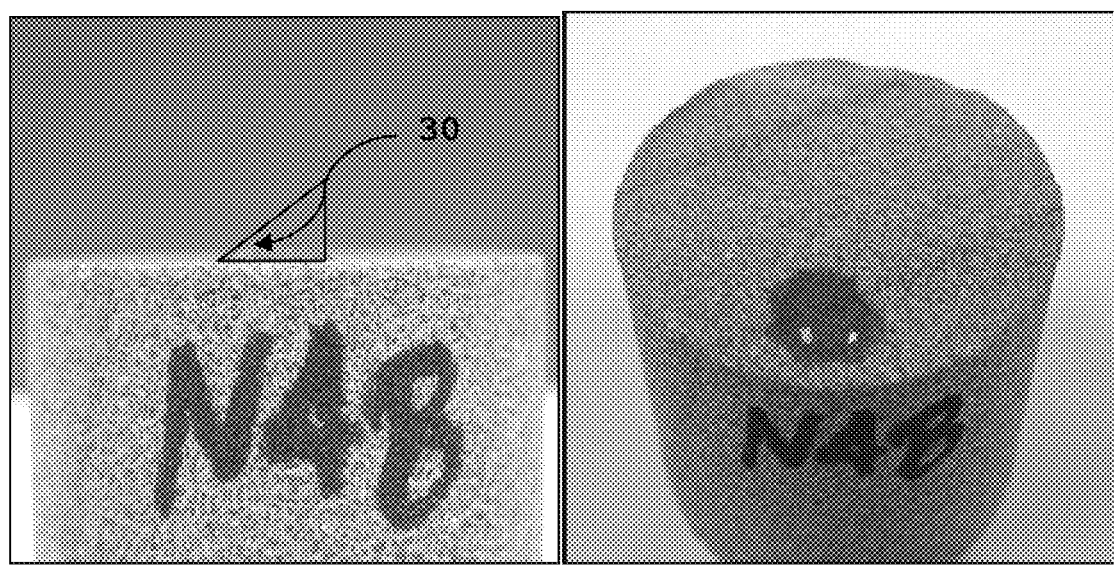
FIG. 3 shows a nugget core treated with a prior art solution.

As the comparison, in a third example the similar core was treated with the fluid made up of 0.2% of a 8:1 weight ratio solution of water:decyl-dimethyl amine oxide in deionized water. The surfactant may form micelles in water if its concentration is above critical micelle concentration. As shown in FIG. 3, the core surface becomes less hydrophilic too, with a contact angle 30 of 40±5°. As indicated from contact angle values, microemulsion seems to perform better than the 0.2% surfactant solution when it comes to surface tension reduction It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

What is claimed is:

1. A method of treating a subterranean formation in a well comprising:
   providing a solvent blend comprising a mixture of n-butyl acetate-ethylene glycol monobutyl ether, a surfactant blend comprising a surfactant and a co-surfactant, an alcohol, and water;
   combining the alcohol, the solvent and surfactant blends with water to produce a well treatment microemulsion, wherein the solvent blend is present at about 23% by volume;
   introducing the microemulsion in to the well; and
   allowing the microemulsion to contact the formation to give intermediate wettability properties.

2. The method of claim 1, wherein the microemulsion is pumped into the well for a fracturing operation.

3. The method of claim 1, further comprising introducing proppant in to the well.

4. The method of claim 1, wherein the alcohol is an alkyl alcohol.

5. The method of claim 1, wherein the surfactant is selected from the group consisting of: alkyl sulfates, sulfonates, carboxylates, ethylene oxide-propylene oxide copolymers, polyoxyethylene alkyl ethers, primary alkylamines, dialkyl secondary amines, ethoxylated fatty amines, amine oxides, and combinations thereof.

6. The method of claim 1, wherein the co-surfactant is an oxyalkylated alcohol.

7. A method of modifying the wettability property of a subterranean formation in a well comprising:
   a. providing a solvent blend comprising a mixture of n-butyl acetate-ethylene glycol monobutyl ether, a surfactant blend comprising a surfactant and a co-surfactant, an alcohol, and water;
   b. combining the alcohol, the solvent and surfactant blends with water to produce a well treatment microemulsion, wherein the solvent blend is present at about 23% by volume;
   c. introducing the microemulsion in to the well;
   d. allowing the microemulsion to contact the formation; and
   e. leaving the formation with intermediate wettability properties.

8. The method of claim 7, wherein the alcohol is an alkyl alcohol.

9. The method of claim 7, wherein the surfactant is decyldimethyl amine oxide.

10. The method of claim 7, wherein the microemulsion is pumped into the well for a fracturing operation.

11. The method of claim 7, further comprising introducing proppant in to the well.

12. The method of claim 7, wherein the surfactant is selected from the group consisting of: alkyl sulfates, sulfonates, carboxylates, ethylene oxide-propylene oxide copolymers, polyoxyethylene alkyl ethers, primary alkylamines, dialkyl secondary amines, ethoxylated fatty amines, amine oxides, and combinations thereof.

13. The method of claim 7, wherein the co-surfactant is an oxyalkylated alcohol.

* * * * *